United States Patent [19]

Dotson, Jr. et al.

[11] 3,915,930
[45] Oct. 28, 1975

[54] FLAME-RETARDANT COMPOSITION

[75] Inventors: Anderson O. Dotson, Jr., Somerset; Francis T. Wadsworth, Trenton, both of N.J.

[73] Assignee: Cities Service Company, Tulsa, Okla.

[22] Filed: July 15, 1974

[21] Appl. No.: 488,363

Related U.S. Application Data

[62] Division of Ser. No. 299,507, Oct. 20, 1972, Pat. No. 3,868,388.

[52] U.S. Cl. ..... 260/45.8 N; 260/45.7 S; 260/326 N
[51] Int. Cl.² ................. C07D 209/34; C08K 5/00
[58] Field of Search ................. 260/45.8 N, 326 N

[56] References Cited
UNITED STATES PATENTS
3,730,940   5/1973   Vernel et al. ................. 260/45.8 N
3,786,023   1/1974   Dotson et al. ................. 260/45.8 N Primary Examiner—Ronald W. Griffin
Attorney, Agent, or Firm—Patricia J. Hogan

[57] ABSTRACT

Novel halogenated bisimides correspond to the formula:

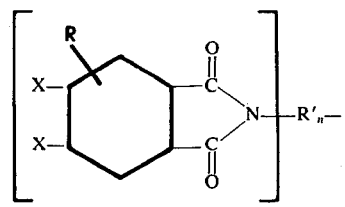

wherein X is bromo or chloro; X' is hydrogen, bromo, or chloro; R is hydrogen or an alkyl radical containing 1–5 carbon atoms; R' is a divalent sulfur radical containing 1–2 sulfur atoms or a divalent organic radical containing 1–24 carbon atoms; and $n$ is 0 or 1. The bisimides are useful as flame retardants for normally flammable organic polymers and, if desired, may be used in conjunction with synergists.

3 Claims, No Drawings

FLAME-RETARDANT COMPOSITION

This is a division, of application Ser. No. 299,507, filed Oct. 20, 1972, now U.S. Pat. No. 3868388, issued Feb. 25, 1975.

BACKGROUND OF THE INVENTION

Field of the Invention

This invention relates to novel halogenated bisimides and to compositions containing them as flame retardants.

Description of the Prior Art

It is known that halogenated compounds are sometimes useful for imparting flame retardancy to normally flammable organic polymers. However, known halogenated flame retardants frequently have one or more of the following disadvantages: the high concentrations at which they must be employed to impart an adequate level of flame retardancy, the degradation of physical properties which they cause when incorporated in organic polymers at these high concentrations, and/or their volatility or instability at temperatures normally used to process the organic polymers.

SUMMARY OF THE INVENTION

An object of this invention is to provide novel halogenated bisimides.

Another object is to provide such bisimides which are useful as flame retardants and avoid the aforementioned disadvantages of many of the known halogenated flame retardants.

A further object is to provide flame-retardant organic polymer compositions containing these bisimides.

These and other objects are attained by providing compounds corresponding to the formula:

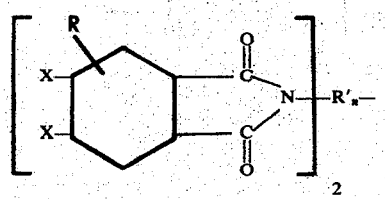

wherein X is bromo or chloro; X' is hydrogen, bromo, or chloro; R is hydrogen or an alkyl radical containing 1–5 carbon atoms; R' is a divalent sulfur radical containing 1–2 sulfur atoms or a divalent organic radical containing 1–24 carbon atoms; and n is 0 or 1. When a flame-retardant composition is desired, a bisimide of this formula is intimately mixed with a normally flammable organic polymer.

DESCRIPTION OF THE PREFERRED EMBODIMENTS

The preferred bisimides of the invention are those wherein X and X' of the formula are bromo, R is hydrogen, and/or R' is a divalent hydrocarbon or bromohydrocarbon radical containing 1–12 carbon atoms. However, as indicated above, X may also be chloro; X' may also be hydrogen or chloro; R may also be methyl, ethyl, propyl, butyl, or pentyl; and R' may be a divalent sulfur radical containing 1–2 carbon atoms or a divalent alkyl, alkenyl, aryl, alkaryl, aralkyl, aralkenyl, cycloalkyl, cycloalkenyl, or other organic radical containing 1–24 carbon atoms. Exemplary of R' radicals are methylene, ethylene, hexylene, 1,2-dibromoethylene, vinylene, phenylene, bromophenylene, toluylene, xylylene, cyclohexylene, bromocyclohexylene, cyclohexenylene, carbonyl, sulfonyl, sulfoxy, thio, aminotriazinylene,

—CH₂—O—CH₂—,

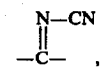

and

The chain length of R' is usually regulated so that the bisimides will have a halogen content of at least about 40%, advantageously at least about 60%, by weight. When there is more than one halogen atom in the molecule, the halogens may be the same or different, but the compounds wherein all halogens are bromine are preferred. Particularly preferred bisimides are N,N'-bis(5,6-dibromocyclohexane-2,3-dicarboximide) and N,N'-(1,2-ethane)-bis(5,6-dibromocyclohexane-2,3-dicarboximide).

The halogenated bisimides of the invention are conveniently prepared by (1) reacting two molar proportions of a suitable cyclohexenedicarboxylic anydride, preferably 5,6-cyclohexene-2,3-dicarboxylic anhydride, with one molar proportion of a suitable diamine corresponding to the formula H₂N—R'ₙ—NH₂ in a suitable solvent or solvent mixture under reflux conditions to form an unsaturated bisimide, (2) removing the solvent and water of reaction, and (3) halogenating or hydrohalogenating the bisimide in a suitable solvent under reflux conditions to add one or two bromine or chlorine atoms to the double bond of the cyclohexene ring. Alternatively, but less preferably, the anhydride may be halogenated or hydrohalogenated before being reacted with the diamine.

The normally flammable organic polymer which is rendered flame retardant in accordance with the invention may be natural or synthetic but is preferably a solid synthetic polymer, more preferably a polymer of an unsaturated hydrocarbon. Exemplary of the polymers are cotton, wool, silk, paper, natural rubber, wood, paint, the high molecular weight homopolymers and copolymers of unsaturated aliphatic and aromatic hydrocarbons (e.g., ethylene, propylene, styrene, etc.), acrylic polymers (e.g., polyacrylonitrile, polymethyl methacrylate, etc.), alkyd resins, cellulose derivatives (e.g., cellulose acetate, methyl cellulose, etc.), epoxy resins, furan resins, isocyanate resins (e.g., polyurethanes), melamine resins, vinyl resins (e.g., polyvinyl acetate, polyvinyl chloride, etc.), polyamide resins (e.g., Nylon 6, Nylon 66, etc.), resorcinol resins, synthetic rubbers (e.g., polyisoprene, polybutadiene, butadiene-acrylonitrile copolymers, butadienestyrene copolymers, butyl rubber, neoprene rubber, etc.), ABS resins, and mixtures thereof.

Since the bisimides of the invention are unusually efficient flame retardants, they are normally used at relatively low concentrations, e.g., about 2–25%, preferably about 3–20%, based on the weight of the composition. To reduce the amount of flame retardant required to achieve a desired level of flame retardancey, it frequently desirable to employ a synergist for the flame retardant, e.g., a free radical-generating compound such as dicumyl peroxide, a conventional metal compound synergist, or an aliphatic or cycloaliphatic phosphite or thiophosphite containing not more than one aromatic radical per phosphorus atom.

Ordinarily, the synergist, when employed, is any of the metal compounds conventionally used as synergists for halogenated flame retardants. Thus, it may be an organometallic compound but is usually an oxide or sulfide of a polyvalent metal such as antimony, arsenic, bismuth, tin, or titanium. Of such compounds, antimony trioxide is preferred. This type of synergist is normally employed in a concentration of about 20–100%, preferably about 50%, based on the weight of the flame retardant.

An aliphatic or cycloaliphatic phosphite or thiophosphite used as a synergist is generally such a compound containing 1–7 phosphorus atoms and 6–60 carbon atoms per phosphorus atom. Exemplary of such phosphites are tridecyl phosphite, trilauryl trithiophosphite, tricetyl trithiophosphite, tristearyl phosphite, distearyl pentaerythritol diphosphite, diisodecyl pentaerythritol diphosphite, poly(bisphenol A pentaerythritol diphosphite) having a degree of polymerization of at least two, and bis(neopentyl) glycol) 1,4-cyclohexanedimethylene phosphite. Distearyl pentaerythritol diphosphite is preferred. This type of synergist is normally employed in a concentration of about 3–100%, based on the weight of the flame retardant.

If desired, two or more synergists of the same or different types may be employed.

The flame retardant compositions of the invention are prepared by intimately mixing the normally flammable organic polymer with the flame retardant and optionally also with other additives, such as synergists, fillers, pigments, plasticizers, stabiliizers, and antioxidants, in any suitable manner. For example, the ingredients may be mixed on a two-roll mill or in an extruder or Banbury mixer.

The invention is advantageous in that the novel bisimides have low volatility, are reasonably stable at polymer processing temperatures, and are effective as flame retardants at sufficiently low concentrations to minimize degradation of physical properties.

The following examples are given to illustrate the invention and are not intended as a limiation thereof. Unless otherwise specified, quantities mentioned are quanities by weight.

EXAMPLE I

Part A

Charge a suitable reaction vessel with 60.8 g. of 5,6-cyclohexene-2,3-dicarboxylic anhydride and 200 cc. of toluene. Stir the mixture, and add 12 g. of ethylene diamine over a period of 5 minutes. Heat the reaction mixture to reflux, add 240 g. of acetic acid, and continue refluxing for two hours after completing the addition. Distill to remove solvent, cool the reaction mixture to ambient temperature, filter, wash, and dry. The process results in a 50% yield of N,N'-(1,2-ethane)-bis(5,6-cyclohexene-2,3-dicarboximide) having a melting point of 142°–145°C.

Part B

Heat a mixture of 16.4 g. of the product of Part A, 4 g. of sodium carbonate, and 250 cc. of chloroform to reflux. Add 16 g. of bromine over a period of 30 minutes. Stir the mixture at reflux for an additional 30 minutes. Cool to 10°C., filter to isolate sodium carbonate, evaporate solvent from the product, wash the product with methanol, and dry. The process results in the formation of 26.6 g. of N, N'-(1,2-ethane)-bis-(5,6-dibromocyclohexane-2,3-dicarboximide) having a bromine content of 50% and a nitrogen content of 4.18%.

Part C

Blend 5 parts of the product of Part B with 92.5 parts of polypropylene and 2.5 parts of antimony trioxide. Mold the blend into test specimens. Test the specimens for oxygen index in accordance with ASTM procedure D-2863. The blend has an oxygen index of 25.8, and the test specimens have an off-white color indicating that the flame retardant has good stability at processing temperatures.

EXAMPLE II

Repeat Example I except for replacing the ethylene diamine with an equimolar amount of hydrazine. Similar results are observed except that the products of Parts A and B are N, N'-bis(5,6-cyclohexene-2,3-dicarboximide) and N,N'-bis(5,6-dibromocyclohexane-2,3-dicarboximide).

It is obvious that many variations may be made in the products and processes set forth above without departing from the spirit and scope of this invention.

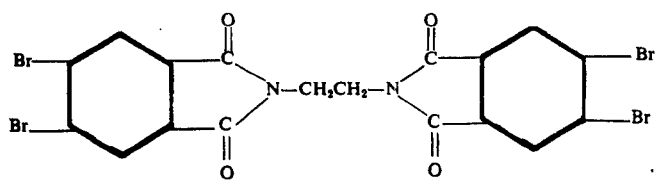

What is claimed is:

1. A composition comprising a normally flammable organic polymer and a flame retardant corresponding to the formula:

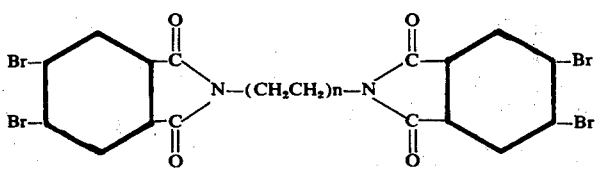

wherein $n$ is 0 or 1.

2. The composition of claim 1 wherein the flame retardant corresponds to the formula:

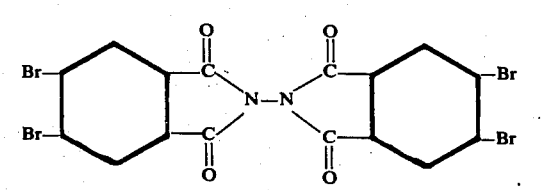

3. The composition of claim 1 wherein the flame retardant corresponds to the formula: